United States Patent [19]
Blank et al.

[11] Patent Number: 6,013,289
[45] Date of Patent: Jan. 11, 2000

[54] **FLAVORANT PREPARED FROM *TRIGONELA FOENUM-GRAECUM* SEEDS**

[75] Inventors: Imre Blank, Savigny; Daniel Jaeger, Hagenbuchzh; Beat Denis Zurbriggen, Buelach, all of Switzerland

[73] Assignee: Nestec S.A., Vevey, Switzerland

[21] Appl. No.: 09/108,393

[22] Filed: Jul. 1, 1998

[30] Foreign Application Priority Data

Jul. 2, 1997 [EP] European Pat. Off. .............. 97202007

[51] Int. Cl.⁷ ............... A23B 7/10; A23K 1/00; C12P 21/06
[52] U.S. Cl. ............. 426/51; 435/68.1; 426/52; 426/533; 426/655
[58] Field of Search .................. 426/49, 50, 51, 426/52, 533, 650, 655; 435/68.1

[56] References Cited

U.S. PATENT DOCUMENTS

| | | | |
|---|---|---|---|
| 5,264,240 | 11/1993 | Ammedick-Naumann et al. | 426/650 |
| 5,449,823 | 9/1995 | Lerch | 562/577 |
| 5,573,926 | 11/1996 | Gunata et al. | 435/74 |
| 5,658,571 | 8/1997 | Gopalan et al. | 424/195.1 |

FOREIGN PATENT DOCUMENTS

| | | | |
|---|---|---|---|
| 2179533 | 6/1996 | Canada | A23G 1/02 |
| 0381972 | 8/1990 | European Pat. Off. | A23L 1/221 |
| 0623580 | 11/1994 | European Pat. Off. | C07C 59/215 |

OTHER PUBLICATIONS

Blank, et al., "Quantification of the Flavour Compounds 3–Hydroxy–4,5–dimethyl–2(5H)–furanone and 5–Ethyl–3–hydroxy–4–methyl–2(5H)–furanone by a Stable Isotope Dilution Assay" published in Progress in Flavour Precursor Studies Analysis–Generation–Biotechnology, Proceedings of the Internal Conference, Würzburg, Germany, Sep. 30–Oct. 2, 1992, pp. 103–109, Allured Publishing Corp., Carol Stream IL USA 1992.

Blank, et al., "Formation of 3–Hydroxy–4,5–dimethyl–2(5H)–furanone (Sotolone) from 4–Hydroxy–L–isoleucine and 3–Amino–4,5–dimethyl–3,4–dihydro–2(5H)–furanone", J. Agric. Food Chem. 1996, 44, 1851–1856.

El–Mahady, et al., "Proteolytic Activity, Amino Acid Composition and Protein Quality of Germinating Fenugreek Seeds (*Trigonella foenum graecum* L.)," Food Chemistry 18 (1985) 19–33.

Lewis, *Spices and Herbs for the Food Industry*, Food Trade Press, Orpington, England, 1984 "Seeds", pp. 141–142.

*Primary Examiner*—Keith Hendricks
*Attorney, Agent, or Firm*—Vogt & O'Donnell, LLP

[57] ABSTRACT

A flavorant composition is prepared by hydrolyzing *Trigonell foenum-graecum* seed material with enzymes, heating the hydrolyzate obtained at a temperature for a time to inactivate the enzymes, centrifuging the heat-treated hydrolyzate to separate the liquid phase from the residue and isolating the liquid phase of the hydrolyzate from the hydrolyzate residue and evaporatively concentrating the isolated liquid phase. Additionally, the concentrated liquid phase may be dried, and the seed material employed may be that of germinated seeds.

20 Claims, No Drawings

FLAVORANT PREPARED FROM *TRIGONELA FOENUM-GRAECUM* SEEDS

BACKGROUND OF THE INVENTION

The present invention relates to preparation of extracts which are employed to flavor foods and to use of enzymatic hydrolysis for preparing flavor extracts and also, particularly, to use of seeds of *Trigonella foenum-graecum*.

*Trigonella foenum-graecum* is a leguminous plant which is very widely distributed in some Mediterranean countries, as well as in Argentina and India (Y. S. Lewis, Spices and Herbs for the Food Industry, Food Trade Press, 1984, p. 141–142). The seeds of *Trigonella foenum-graecum* are used in particular as spices, for the preparation of curry in India, for example, as vegetables, as fodder for animals and for their medicinal powers (El-Mahdy et al., Food Chemistry, 1985, 18, 19–33).

It is also known to use *Trigonella foenum-graecum* for its flavouring power.

European Patent Application Publication No. 0 381 972 describes a process for using ground and roasted or non-roasted *Trigonella foenum-graecum* in the preparation of a soya sauce or of a fish sauce, so as to refine their taste.

Moreover, European Patent Application Publication No. 0 623 580 describes the stereospecific formation of (4S)-hydroxy-3-methyl-2-ketopentanoic acid from 4-hydroxy-L-isoleucine, isolated from *Trigonella foenum-graecum*, treated enzymatically with the aid of an L-amino acid oxidase or with the aid of microorganisms producing such an enzyme but which cannot be used in the food sector. 5(S)-Sotolone is then spontaneously formed from (4S)-hydroxy-3-methyl-2-ketopentanoic acid.

SUMMARY OF THE INVENTION

The aim of the present invention is to provide a simple and rapid process allowing the preparation of a flavour extract from the material of *Trigonella foenum-graecum* seeds containing various flavour compounds, giving a round note to food compositions into which it is incorporated.

To this effect, in the process for the preparation of a flavour extract according to the present invention, an enzymatic hydrolysis is carried out on the material of *Trigonella foenum-graecum* seeds, the hydrolyzate is heat-treated, it is centrifuged, so as to separate the liquid phase containing the flavours from the hydrolyzed material residue for isolating the liquid phase from the residue, and then this liquid phase is concentrated by evaporation.

It has been observed, surprisingly, that the process according to the present invention makes it possible to prepare an extract from the material of *Trigonella foenum-graecum* seeds comprising various flavour compounds, in addition to sotolone. This flavour extract can be advantageously used, in particular, in liquid form, in pasty form or in powdered form, for the preparation of food compositions, such as in particular sauces, liquid or solid stocks, cheeses, soups or culinary dishes, so as to enhance their flavour notes.

DETAILED DESCRIPTION OF THE INVENTION

In the process according to the present invention, there may be used in particular the *Trigonella foenum-graecum* seeds marketed by the company Samen Mauser AG, Industriestrasse 24, CH-8408 Winterthur.

In a first preferred embodiment of the present process, a mixture containing germinated seeds of *Trigonella foenum-graecum* in powdered form is prepared. To do this, the seeds are allowed to soak in water for 10–20 h before depositing them in a germination apparatus, in particular the BIOSNACKY-type apparatus marketed by Biorex S.A., BIOREX AG, Kappler Strasse 55, CH-9642 Ebnat-Kappel. The seeds are then allowed to germinate in this apparatus at room temperature for 1–7 days, taking care to spray them with water every 24 h. Next, they are finely ground so as to obtain a paste. If the seeds are allowed to germinate for a period of more than 7 days, there is a risk of having microbiologically contaminated germinated seeds of *Trigonella foenum-graecum*.

Furthermore, it is known that the metabolism of *Trigonella foenum-graecum* seeds changes during germination. At the beginning of germination, the *Trigonella foenum-graecum* seeds contain very few endogenous proteases, whereas after 4 days of germination, for example, they contain a larger quantity of endogenous proteases. Consequently, the content of free amino acids and the content of peptides, contained in the seeds, vary according to the duration of germination of the seeds, which allows the formation of more diversified flavour compounds.

In a second preferred embodiment of the present process, a mixture containing 80–95% of water, and 5–20% of *Trigonella foenum-graecum* seeds in flour form is prepared.

Enzymatic hydrolysis of the seed material can then be carried out at a pH of between 3.20–7.10, at a temperature of 40–65° C., for 5 h–25 h, for example.

It is possible, in particular, to carry out the enzymatic hydrolysis of the mixture in the presence of proteases, peptidases, an arabanase, cellulases, a β-glucanase, a hemicellulase, an alcalase, a pectinase and/or a xylase. The proteolytic enzymes make it possible to increase the rate of hydrolysis of the flavour extract and the cellulosic enzymes make it possible to reduce its viscosity and to generate carbohydrate compounds. FLAVOURZYME 1000L enzyme product which is a protease-peptidase complex isolated by fermentation from a specific strain of *Aspergillus oryzae*, VISCOZYME L enzyme product which is an arabanase, cellulase, β-glucanase, hemicellulase, pectinase and xylase complex, isolated from a strain of Aspergillus and/or CELLUCLAST 1.5L enzyme product which is a cellulase, isolated from *Trichoderma reesei*, are preferably used as mixtures of enzymes. These three mixtures of enzymes are marketed by the company Novo Nordisk Ferment AG, Neumatt, CH-4243 Dittingen.

The mixture can then be heat-treated at 75–100° C. for 10–60 min, so as to inactivate the enzymes, for example.

If a mixture containing germinated seeds of *Trigonella foenum-graecum* in powdered form is prepared, after the heat-treatment, the mixture can be hydrolysed with at least one galactomannanase, so as to hydrolyse the sugars which are present in a proportion of the order of 40% relative to the dry weight of the germinated seeds. The mixture can then be heated at 75–110° C. for 15–80 min so as to inactivate the enzyme, for example. It is also possible to use, in particular, GAMANASE enzyme product, obtained by the company Novo Nordisk Ferment AG, Neumatt, CH-4243 Dittingen.

The mixture can be centrifuged at 4000–6000 rpm for 15–45 min in order to isolate the liquid phase of the mixture containing the flavours from the hydrolyzed material residue, for example. The centrifugation step makes it possible, furthermore, to reduce the bitterness of the flavour extract according to the present invention.

Finally, this liquid phase can be evaporated at a temperature of 30–70° C., at a pressure of 7–15 mbar, for 1–3 h, so as to concentrate it, for example.

The concentrated liquid phase can then be dried so as to obtain a powdered flavour extract, for example. It can in particular be dried under vacuum for 10–20 h, at a pressure of 7–15 mbar and at a temperature of 55–80° C. It can also be dried on a support, such as maltodextrin and/or glucidex, for example. Finally, the concentrated liquid phase can be dried by spray-drying, for example.

From this flavour extract in liquid form or in powdered form, it is possible to prepare a pasty flavour extract. Thus, it is possible to mix, at 45–65° C., 20–40% powdered flavour extract with 20–30% of water and 30–70% of fat, in particular chicken fat or beef fat, so as to obtain a pasty flavour extract, for example. It is also possible to prepare a pasty flavour extract by mixing 30–70% of liquid flavour extract, according to the present invention, and 30–70% of fat, in particular chicken fat or beef fat, for example.

The subject of the present invention is also a flavour extract containing 2–250 ppm of sotolone. The subject of the present invention is in particular the flavour extract obtained using the process according to the present invention.

Finally, the present invention also relates to any food composition containing 1–15% of flavour extract according to the present invention. The flavour extract may be incorporated in liquid form, in dried form or in pasty form, for example. It may be advantageously used in particular to enhance the flavour note of sauces, liquid or solid stocks, cheeses, soups or culinary dishes, for example.

ILLUSTRATIVE PREPARATION AND TEST PROCEDURES AND EXAMPLES

The preparation process and the flavour extract, according to the present invention, are described in greater detail with the aid of analytical tests, of sensory analyses tests and of examples of application, below. The percentages are given by weight, unless otherwise stated.

Test 1: Measurement of the Rate of Enzymatic Hydrolysis

A flavour extract is prepared using the process according to the present invention and the value of the rate of enzymatic hydrolysis of this extract is compared with that of samples which have not been subjected to enzymatic hydrolysis.

To do this, Trigonella foenum-graecum seeds are soaked in water for 15 h before placing them in a germination apparatus of the BIOSNACKY type, marketed by the company Biorex S.A., BIOREX AG, Kappler Strasse 55, CH-9642 Ebnat-Kappel. The seeds are then allowed to germinate, at room temperature, in this apparatus, for 4 days, while spraying them with water every 24 h.

These germinated seeds are divided into 3 equivalent samples.

Two of these samples are left to incubate at 25° C., for 24 h or 48 h, before measuring their enzymatic hydrolysis rate.

In parallel, the seeds of the third sample are finely ground so as to obtain a mixture of germinated seeds of Trigonella foenum-graecum in powdered form.

This mixture is then subjected to enzymatic hydrolysis, in the presence of 0.5% of FLAVOURZYME 1000L, enzyme product 1% of VISCOZYME L enzyme product and 0.5% of CELLUCLAST enzyme product, at a temperature of 50° C., at pH 5, for 23 h. These 3 mixtures of enzymes are marketed by the company Novo Nordisk Ferment AG, Neumatt, CH-4243 Dittingen.

The mixture is then heat-treated at 90° C. for 20 min so as to inactivate the enzymes.

The mixture is hydrolysed at pH 5, at a temperature of 65° C., for 24 h, in the presence of 0.5% of GAMANASE, marketed by the company Novo Nordisk Ferment AG, Neumatt, CH-4243 Dittingen. The mixture is then heated at 95° C. for 60 min so as to inactive the enzyme.

In order to isolate the liquid phase containing the flavours, the mixture is then centrifuged at 5000 rpm for 30 min.

The liquid phase is finally concentrated by evaporation for 2 h at a temperature of 65° C. and at a pressure of 8 mbar. The rate of hydrolysis of this concentrated liquid phase which constitutes the flavour extract is then measured.

The results of the different measurements carried out are stated in Table I.

The rate of enzymatic hydrolysis is the ratio of the quantity of total nitrogen (Ntot) to the quantity of free amino acids (Nα). The quantity of total nitrogen for each sample is measured according to the Kjeldahl method described in particular by P. R. Rexroad et al. (J. AOAC, vol 59, No. 6, 1213–1217, 1976). The quantity of free amino acids was measured according to the van Slyke method described in particular by P. Schenk et al., (Lebensmitteluntersuchung und Hygiene, 56, 484, 1965).

In addition, the dry matter content is given in % and is equivalent to the ratio of the value of the weight of the sample, after drying for 4 h, at 70° C., at a pressure of 20 mbar, to the value of the total weight of the sample.

TABLE I

| Sample | Enzymatic hydrolysis | Incubation | DM (%) | Rate of hydrolysis (%) |
|---|---|---|---|---|
| 1 | – | 24h/55° C. | 97.4 | 29.80 |
| 2 | – | 48h/55° C. | 96.7 | 27.70 |
| 3 | + | — | 98.0 | 39.8 | legend:
DM: dry matter content
rate of hydrolysis: measurement of Nα/Ntot

The results stated in Table I show the cumulative effect of the endogenous enzymes and of the proteolytic enzymes when an enzymatic hydrolysis is carried out.

Indeed, if the seeds are allowed to germinate for 4 days and they are then left to incubate at 55° C. for 24 h or 48 h, a rate of enzymatic hydrolysis is obtained which corresponds only to the activity of the endogenous enzymes and which is markedly less than that obtained after enzymatic hydrolysis.

Thus, the step of enzymatic hydrolysis makes it possible to increase the yield of hydrolysis and, as a result, the release of amino acids as well as the development of various flavour compounds.

Test 2: Content of Sotolone and Content of 4-hydroxy-L-isoleucine in the Flavour Extract as a Function of the Duration of Germination The content of sotolone as well as the content of 4-hydroxy-L-isoleucine contained in the germinated seeds of Trigonella foenum-graecum are measured as a function of the duration of germination, so as to determine the activity of the endogenous enzymes.

To do this, germination of the Trigonella foenum-graecum seeds is carried out in the manner as described in Test 1, except for the fact that this germination is carried out for 1 day, 2 days, 3 days or 4 days.

The seeds thus germinated are then left to incubate for 24 h at 55° C. so as to permit the activity of the endogenous enzymes.

The content of sotolone as well as the content of 4-hydroxy-L-isoleucine contained in the germinated seeds are then measured. The content of sotolone is measured according to the method as described by I. Blank et al. (J. Agric. Food Chem., 1966, 44, 1851–1856) and the content of 4-hydroxy-L-isoleucine is measured by HPLC.

The results obtained are stated in Table II.

TABLE II

| Sample | Duration of germination (days) | Rate of hydrolysis (%) | DM (%) | Content of HIL (mg/g) | Content of sotolone (ppm) |
|---|---|---|---|---|---|
| control | 0 | 4.1 | 25 | 12.3 | 2.0 |
| 1 | 1 | 3.4 | 34 | 8.0 | 1.7 |
| 2 | 2 | 8.8 | 32 | 8.7 | 3.0 |
| 3 | 3 | 8.8 | 34 | 9.0 | 3.7 |
| 4 | 4 | 9.7 | 31 | 11.7 | 7.0 |

Legend:
content of HIL: content of 4-hydroxy-L-isoleucine
the content of HIL and the content of sotolone are calculated on the basis of a dry matter content equal to 100%.

The results stated in Table II demonstrate the fact that the rate of hydrolysis increases as a function of the duration of germination.

Moreover, these results demonstrate the fact that 4-hydroxy-L-isoleucine is a compound which is consumed during the first phase of germination of the *Trigonella foenum-graecum* seeds. Indeed, the content of 4-hydroxy-L-isoleucine in the control sample is 12.3 mg/g, whereas after 1 day of germination (sample 1) the content is now only 8 mg/g. This can be explained, on the one hand, by the fact that 4-hydroxy-L-isoleucin is partially metabolised by the endogenous enzymes which are active during germination and, on the other hand, by the fact that it is broken down during the Strecker reaction at a high temperature and in the presence of α-dicarbonyl compounds. Moreover, part of the 4-hydroxy-L-isoleucine is converted to sotolone, after a sufficient period of germination. Finally, the 4-hydroxy-L-isoleucine is lactonized. However, the formation of 4-hydroxy-L-isoleucine by endogenous enzymes is also observed during germination.

This makes it possible to understand the phenomenon of degradation and regeneration of 4-hydroxy-L-isoleucine during germination.

Between the second day of germination (sample 2) and the fourth day of germination (sample 4), the content of 4-hydroxy-L-isoleucine increases to reach a content of 11.7 mg/g, which is a value close to that measured for the nongerminated *Trigonella foenum-graecum* seeds (12.3 mg/g).

Finally, the results stated in Table II demonstrate the fact that the formation of sotolone is effective after 3 days of germination of the *Trigonella foenum-graecum* seeds. Indeed, after 1 day of germination, or even 2 days, the content of sotolone is close to that measured for the non-germinated *Trigonella foenum-graecum* seeds (control sample).

Test 3: Evaluation of the Flavour Note

An extract is prepared using the process according to the present invention and then it is added to a sauce containing wheat gluten for evaluation of the flavour note.

To do this, a flavour extract is prepared as described in Test 1.

5% of this extract is added to a sauce containing powdered wheat gluten. The whole is then diluted in 250 ml of water, while mixing, so as to obtain an unctuous sauce.

A sauce having a very pronounced meat-like taste is obtained.

Test 4: Study of the Stability of the Flavour Extract

The stability of the flavour extract obtained using the process according to the present invention is evaluated over a period of 1 to 18 months at various temperatures. The study of stability applies to an evaluation of the colour, the texture of the product as well as the taste of the product, based on organoleptic analyses.

To do this, the procedure is carried out as described in Test 1, in order to prepare a flavour extract according to the present invention.

A portion of this extract is taken and divided into several samples. These samples (samples 1 to 5) are stored at various temperatures (at 4° C., 20° C., 25° C., 30° C. or 37° C.), for 18 months and the stability of these samples is checked every month for the first 6 months, and then at the 9th, 12th, 15th and 18th months.

The other portion of the extract is mixed with a beef stock so as to obtain a flavour extract concentration of 0.619 g/l. The beef stock is prepared, by mixing in 1 l of water, 19 g of a composition containing 373 g of maltodextrin, 190 g of salt, 100 g of yeast extract, 90 g of dextrose, 80 g of starch, 65 g of beef fat, 36 g of sugar, 5 g of caramel colour, 2.5 g of onions, 2 g of citric acid, 1 g of pepper, 0.5 g of garlic, 0.5 g of thyme and 0.5 g of marjoram. This stock containing the flavour extract portion is also divided into 5 samples (samples 6 to 10) which are stored at various temperatures (at 4° C., 20° C., 25° C., 30° C. or 37° C.) for 18 months. The stability of these samples is also checked every month for the first 6 months, and then at the 9th, 12th, 15th and 18th months.

The results of the stability study are stated in Table III.

TABLE III

| Sample | Temperature (° C.) | Tasting score after a period of storage of (months) | | | | | | | | | |
|---|---|---|---|---|---|---|---|---|---|---|---|
| | | 1 | 2 | 3 | 4 | 5 | 6 | 9 | 12 | 15 | 18 |
| 1 | 4 | n.d. | n.d. | n.d. | n.d. | n.d. | n.d. | n.d. | n.d. | n.d. | n.d. |
| 2 | 20 | 8.00 | 9.00 | 9.00 | 9.00 | 9.00 | 9.00 | 9.00 | 9.00 | 9.00 | 9.00 |
| 3 | 25 | 8.50 | 9.00 | 9.00 | 9.00 | 9.00 | 9.00 | 9.00 | 8.50 | 7.50 | 7.00 |
| 4 | 30 | 9.00 | 8.50 | 8.50 | 8.50 | 8.50 | 8.00 | 8.00 | 7.00 | 6.50 | 5.50 |
| 5 | 37 | 9.00 | 8.50 | 8.50 | 8.00 | 8.00 | 6.50 | 6.50 | 0.00 | 0.00 | 0.00 |
| 6 | 4 | 9.00 | 9.00 | 9.00 | 9.00 | 9.00 | 9.00 | 9.00 | 9.00 | 9.00 | n.d |
| 7 | 20 | 9.00 | 9.00 | 9.00 | 8.50 | 9.00 | 9.00 | 8.50 | 8.00 | 7.50 | n.d. |
| 8 | 25 | 9.00 | 9.00 | 9.00 | 8.00 | 8.50 | 7.50 | 7.50 | 7.00 | 6.00 | n.d. |
| 9 | 30 | 8.50 | 8.50 | 8.00 | 7.50 | 7.00 | 6.00 | 5.50 | 0.00 | 0.00 | n.d. |
| 10 | 37 | 8.00 | 8.00 | 7.50 | 5.50 | 0.00 | 0.00 | 0.00 | 0.00 | 0.00 | n.d. |

Legend:
n.d.: not determined
10–8.50: excellent stability
8.00–7.00: good stability
6.00–5.00: acceptable stability
4.00–0.00: poor stability, unacceptable result In general, it is observed that the stability of the flavour extract depends on the chemical reactions to which the flavour extract is subjected during the period of storage. These chemical reactions, in particular the Maillard reaction, depend on the storage conditions, in particular the duration, temperature and exposure to light.

The results stated in Table III demonstrate the fact that the flavour extract retains a better stability when it is stored at a temperature of less than or equal to 30° C.

Moreover, when the flavour extract according to the present invention is mixed with a beef stock, it is observed that it retains a very good stability if it is stored at 4° C. or at 20° C.

On the other hand, the results stated in Table III demonstrate the fact that the flavour extract according to the present invention, mixed or otherwise with a beef stock, loses its stability when it is stored at a temperature greater than 30° C. This loss of stability of the flavour extract is due to the acceleration, at these temperature values, of the chemical reactions of degradation which the flavour extract undergoes during its storage.

Furthermore, when the flavour extract is mixed with a beef stock, it is observed that this contributes to an increase in the Maillard reactions. Thus, the quality of the flavour extract, under these conditions, becomes increasingly poor the higher the temperature. It is observed, in particular, that the meat-like flavour note of the preparation is lost and that a preparation is obtained whose colour changes increasingly to dark brown.

EXAMPLE 1

To prepare a flavour extract according to the present invention, Trigonella foenum-graecum seeds are allowed to soak in water for 15 h before placing them in a germination apparatus of the BIOSNACKY type, marketed by the company Biorex S.A., Kappler Strasse 55, CH-9642 Ebnat-Kapel. The seeds are then allowed to germinate, at room temperature, in this apparatus, for 4 days, while spraying them with water every 24 h.

The seeds thus germinated are finely ground so as to obtain a mixture of germinated seeds of Trigonella foenum-graecum in powdered form.

This mixture is then subjected to enzymatic hydrolysis in the presence of 0.5% of FLAVOURZYME 1000L enzyme product, 1% of VISCOZYME L enzyme product and 0.5% of CELLUCLAST enzyme product, at a temperature of 50° C., at pH 5, for 23 h. These 3 enzymes are marketed by the company Novo Nordisk Ferment AG, Neumatt, CH-4243 Dittingen.

The mixture is then heat-treated at 90° C. for 20 min so as to inactivate the enzymes.

The mixture is hydrolysed at pH 5, at a temperature of 65° C., for 24 h, in the presence of 0.5% of GAMANASE, marketed by the company Novo Nordisk Ferment AG, Neumatt, CH-4243 Dittingen. The mixture is then heated at 95° C. for 60 min so as to inactivate the enzyme.

In order to isolate the liquid phase containing the flavours, the mixture is then centrifuged at 5000 rpm for 30 min.

The liquid phase is then concentrated by evaporation for 2 h 00 min at a temperature of 65° C. and at a pressure of 8 mbar.

Finally, the concentrated liquid phase is dried in the presence of a drying support, maltodextrin, so as to obtain a dried flavour extract.

EXAMPLE 2

A food composition is prepared which contains dried flavour extract, as prepared in Example 1.

To do this, a starting composition is prepared which contains 378 g of maltodextrin, 190 g of salt, 100 g of yeast extract, 91 g of dextrose, 80 g of starch, 65 g of chicken fat, 36 g of sugar, 0.5 g of caramel colour, 2.5 g of turmeric, 2 g of citric acid, 1 g of pepper, 0.5 g of garlic, 0.5 g of rosemary and 0.5 g of ginger.

0.62 g of the dried flavour extract and 19 g of this starting composition and 1.2 g of salt are then added to 1 l of hot water.

A food composition, a chicken stock, having a highly pronounced chicken flavour, is produced.

EXAMPLE 3

A beef stock is prepared which contains the dried flavour according to the present invention.

To do this, a dried flavour extract is prepared as described in Example 1, except for the fact that the Trigonella foenum-graecum seeds are not allowed to germinate.

In parallel, a starting composition is prepared which contains 350 g of maltodextrin, 170 g of salt, 110 g of yeast extract, 91 g of dextrose, 80 g of starch, 65 g of beef fat, 30 g of sugar, 0.5 g of caramel colour, 3 g of turmeric, 2 g of citric acid, 1 g of pepper, 0.5 g of garlic, 0.5 g of rosemary and 0.5 g of ginger.

0.65 g of the dried flavour extract and 25 g of this starting composition and 1.2 g of salt are then added to 1 l of hot water.

A beef stock, having a highly pronounced beef flavour, is thus prepared.

EXAMPLE 4

The dried flavour extract as obtained in Example 1 is used and it is fermented with a yeast, so as to obtain a flavour base having a highly developed meat stock flavour.

To do this, a culture medium is prepared which contains 408 g of the dried flavour extract according to the present invention, in 1 l of water, in which a strain of Candida versatilis, at a concentration of $10^7$ cfu/ml is incubated for 4 days, at 30° C., with aeration.

A step of pasteurization at 90° C. for 30 minutes is then carried out before drying under vacuum at 12 mbar, at 60° C., for 10 h, so as to obtain a flavour base in powder form.

A flavour base having a highly developed meat stock flavour and for which the quantity of reducing sugars is lowered is thus obtained.

Table IV shows the reducing sugar profile before and after fermentation.

TABLE IV

| Reducing sugar | Quantity of reducing sugar before fermentation (%) | Quantity of reducing sugar after fermentation (%) |
| --- | --- | --- |
| glucose | 3 | 0.5 |
| fructose | 2 | 0.2 |
| arabinose | 0.3 | 0.1 |
| xylose | 0.3 | 0.1 |

Table IV shows the decrease in the quantity of reducing sugars in the flavour base thus prepared. This decrease allows a better quality during storage of the flavour base.

We claim:

1. A process for preparing a flavorant composition comprising:

hydrolyzing *Trigonella foenum-graecum* seed material with enzymes to obtain a hydrolyzate comprising a liquid phase and hydrolyzed material residue;

heating the hydrolyzate at a temperature for a time to inactivate the enzymes to obtain a heat-treated hydrolyzate;

centrifuging the heat-treated hydrolyzate to separate the liquid phase from the residue and isolating the liquid phase from the residue to obtain an isolated liquid phase; and evaporatively concentrating the isolated liquid phase to obtain a concentrated liquid extract composition.

2. A process according to claim 1 further comprising drying the concentrated liquid extract composition to obtain a dried extract composition.

3. A process according to claim 1 wherein the seed material comprises seeds ground-up to flour material and further comprising preparing a mixture comprising, by weight, from 80% to 95% of water and from 5% to 20% of the flour material and then hydrolyzing the flour material of the mixture.

4. A process according to claim 1 wherein the seed material is ground-up germinated seeds.

5. A process according to claim 1 further comprising germinating *Trigonella foenum-graecum* seeds to obtain germinated seeds, grinding the germinated seeds to obtain ground-up seed material and then hydrolyzing the ground-up seed material.

6. A process according to claim 5 further comprising soaking the seeds in water prior to germinating the seeds.

7. A process according to claim 5 wherein the seeds are germinated for from 1 day to 7 days.

8. A process according to claim 5 wherein the seeds are germinated for from 4 days to 7 days.

9. A process according to claim 5 or 6 further comprising, after heating the hydrolyzate and prior to centrifuging, further hydrolyzing the heat-treated hydrolyzate with galactomannase enzymes to obtain a further hydrolyzate comprising a liquid phase and hydrolyzed material residue and heating the further hydrolyzate at a temperature for a time to inactivate the galactomannase enzymes to obtain the heat-treated hydrolyzate for the centrifuging.

10. A process according to claim 1 wherein the enzymes comprise proteolytic enzymes.

11. A process according to claim 9 wherein the enzymes comprise proteolytic enzymes.

12. A process according to claim 10 wherein the enzymes further comprise cellulosic enzymes.

13. A process according to claim 1 wherein the enzymes are selected from the group consisting of a protease, a peptidase, an arabanase, a cellulase, a β-glucanase, a hermicellulase, a pectinase and a xylase.

14. A process according to claim 1 wherein the seed material is hydrolyzed at a pH of from 3.20 to 7.10 and at a temperature of from 40° C. to 65° C. for from 5 hours to 25 hours.

15. A process according to claim 1 wherein the hydrolyzate is heated at a temperature of from 75° C. to 110° C. for from 10 minutes to 60 minutes to inactivate the enzymes.

16. A process according to claim 9 wherein the further hydrolyzate is heated at a temperature of from 75° C. to 110° C. for from 15 minutes to 80 minutes to inactivate the enzymes.

17. A process according to claim 1 wherein the heat-treated hydrolyzate is centrifuged at from 4,000 rpm to 6,000 rpm for from 15 minutes to 45 minutes to separate the liquid phase from the residue.

18. A process according to claim 1 wherein the isolated liquid phase is heated at a temperature of from 30° C. to 70° C. under a pressure of from 7 mbar to 15 mbar for from 1 hour to 3 hours to obtain the concentrated liquid extract composition.

19. A process according to claim 1 wherein the concentrated liquid extract composition comprises sotolone in an amount of 5 ppm to 250 ppm.

20. A process according to claim 2 wherein the dried extract composition comprises sotolone in an amount of from 5 ppm to 250 ppm.

* * * * *

UNITED STATES PATENT AND TRADEMARK OFFICE
CERTIFICATE OF CORRECTION

PATENT NO. : 6, 013, 289
DATED : January 11, 2000
INVENTOR(S) : Imre BLANK, et al.

It is certified that error appears in the above-identified patent and that said Letters Patent is hereby corrected as shown below:

In line 3 of <u>each</u> of claims 19 and 20 (column 10), delete "5" and insert therefor -- 2 --.

Signed and Sealed this

Fifth Day of December, 2000

Attest:

Q. TODD DICKINSON

*Attesting Officer*

*Director of Patents and Trademarks*